(12) United States Patent
Kumar

(10) Patent No.: US 8,743,387 B2
(45) Date of Patent: Jun. 3, 2014

(54) GRID COMPUTING SYSTEM WITH VIRTUAL PRINTER

(75) Inventor: Rajendra Kumar, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2050 days.

(21) Appl. No.: 11/008,718

(22) Filed: Dec. 9, 2004

(65) Prior Publication Data

US 2006/0126104 A1    Jun. 15, 2006

(51) Int. Cl.
*G06F 3/12*      (2006.01)
*G06K 15/00*     (2006.01)

(52) U.S. Cl.
USPC ....... 358/1.15; 358/1.14; 358/1.13; 358/1.16; 358/1.1

(58) Field of Classification Search
None
See application file for complete search history.

(56) References Cited

U.S. PATENT DOCUMENTS

| | | | | |
|---|---|---|---|---|
| 4,547,850 A | * | 10/1985 | Genma | 709/253 |
| 6,542,252 B2 | * | 4/2003 | Brossman et al. | 358/1.13 |
| 7,050,184 B1 | * | 5/2006 | Miyamoto | 358/1.15 |
| 7,312,886 B2 | * | 12/2007 | Gomi | 358/1.15 |
| 2003/0103235 A1 | * | 6/2003 | Gomi | 358/1.15 |
| 2005/0223299 A1 | * | 10/2005 | Childress et al. | 714/47 |

* cited by examiner

Primary Examiner — Marcus T Riley

(57) ABSTRACT

A grid computing system is disclosed. The grid computing system includes one or more printer nodes representing distributed print resources, an information repository, and a grid distributed resource manager. Continuing, the information repository includes printer attributes associated with the printer nodes. Further, the grid distributed resource manager provides a virtual printer to a user based on the distributed print resources. Also, the grid distributed resource manager accepts and assigns print jobs submitted to the virtual printer by the user.

24 Claims, 7 Drawing Sheets

PRINTER ATTRIBUTES

| |
|---|
| PRINTER ID 350 |
| PRINTER TYPE 350 |
| COLOR TYPE 350 |
| PAPER SIZE 350 |
| PAPER ORIENTATION 350 |
| SINGLE SIDED 350 |
| FONT TYPE 350 |
| FONT SIZE 350 |
| ⋮ 350 |
| PRINTER LOCATION 350 |

FIG. 3B

GRID COMPUTING SYSTEM WITH VIRTUAL PRINTER

BACKGROUND OF THE INVENTION

1. Field of the Invention

The present invention generally relates to grid computing systems. More particularly, the present invention relates to providing a virtual printer in a grid computing system.

2. Related Art

A grid computing system enables a user to utilize distributed resources (e.g., computing resources, storage resources, network bandwidth resources) by presenting to the user the illusion of a single computer with many capabilities. Typically, the grid computing system integrates in a collaborative manner various networks so that the resources of each network are available to the user. Moreover, the grid computing system generally has a grid distributed resource manager, which interfaces with the user, and a plurality of grid subdivisions, wherein each grid subdivision has the distributed resources. Each grid subdivision includes a plurality of nodes, wherein a node provides a resource.

The user can submit a job to the grid computing system via the grid distributed resource manager. The job may include input data, identification of an application to be utilized, and resource requirements for executing the job. The job may include other information. Typically, the grid computing system uses a scheduler having a hierarchical structure to schedule the jobs submitted by the user. The scheduler may perform tasks such as locating resources for the jobs, assigning jobs, and managing job loads.

If the user desires to print the results of the submitted job, the user may submit a script file with the job. This script file may include a print command for a specific printer and printer-specific information, which gets executed after the job is completed.

Unfortunately, this print process does not utilize the benefits of the grid computing system even though a printer is also a resource. That is, benefits such as load sharing, higher resource utilization, and flexibility in terms of selecting resources from a pool of available resources, are not applied to print resources.

SUMMARY OF THE INVENTION

A grid computing system is disclosed. The grid computing system includes one or more printer nodes representing distributed print resources, an information repository, and a grid distributed resource manager. Continuing, the information repository includes printer attributes associated with the printer nodes. Further, the grid distributed resource manager provides a virtual printer to a user based on the distributed print resources. Also, the grid distributed resource manager accepts and assigns print jobs submitted to the virtual printer by the user.

BRIEF DESCRIPTION OF THE DRAWINGS

The accompanying drawings, which are incorporated in and form a part of this specification, illustrate embodiments of the invention and, together with the description, serve to explain the principles of the present invention.

FIG. 3B illustrates a plurality of printer attributes in accordance with an embodiment of the present invention.

DETAILED DESCRIPTION OF THE INVENTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

Figure 1:
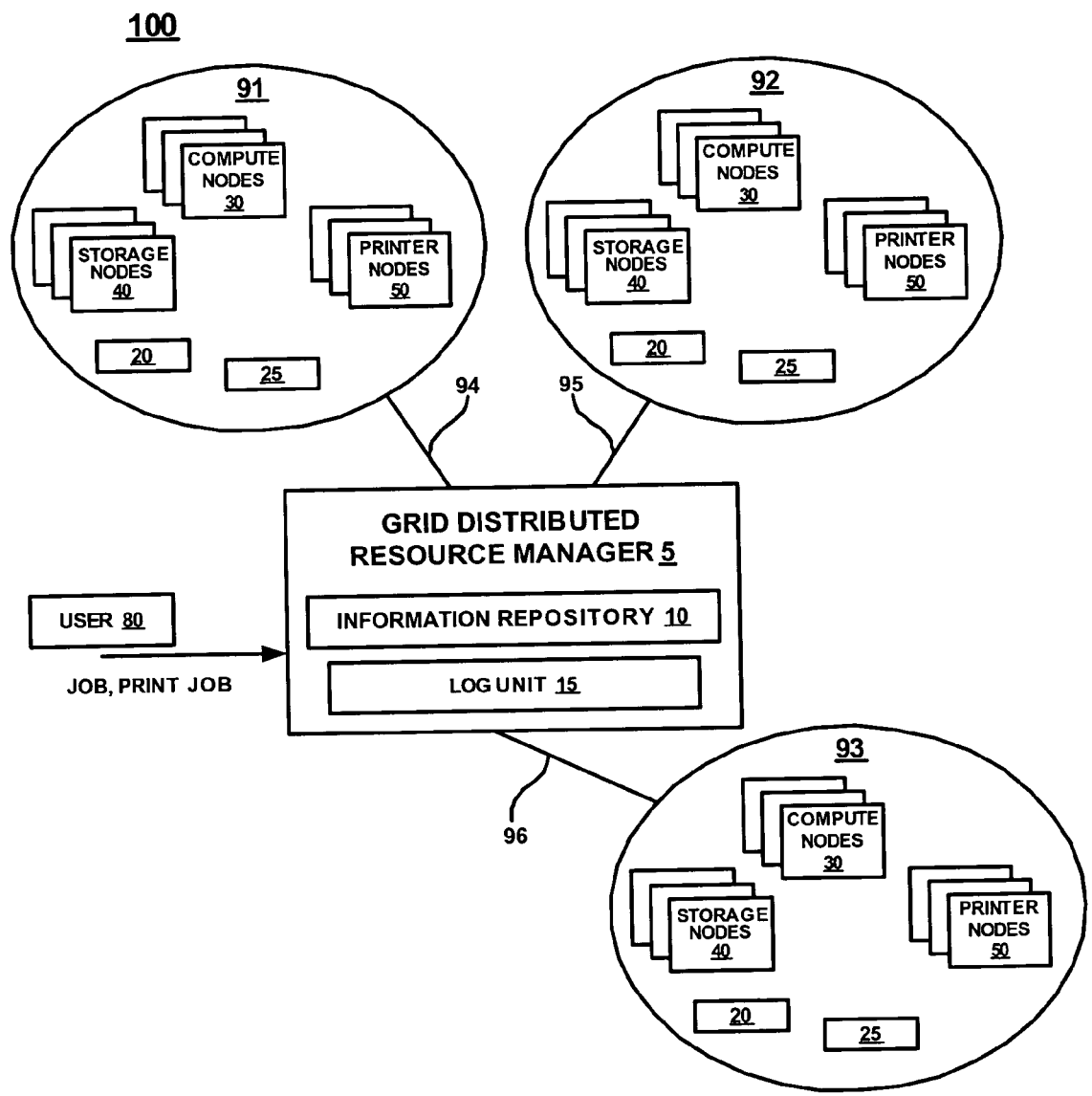
FIG. 1 illustrates a block diagram of a grid computing system in accordance with an embodiment of the present invention.

FIG. 1 illustrates a block diagram of a grid computing system 100 in accordance with an embodiment of the present invention. The grid computing system 100 accepts jobs and print jobs from a user 80. A job may include input data, identification of an application to be utilized, and resource requirements for executing the job. The job may include other information. A print job may include print specifications (e.g., number of copies to print, print color to use, paper size to use, paper orientation to use, printer location where user 80 desires to pick up the print output, etc.) for executing the print job.

As depicted in FIG. 1, the grid computing system 100 includes a grid distributed resource manager 5 and a plurality of grid subdivisions 91-93. The grid distributed resource manager 5 provides an interface to enable the user 80 to submit a job and a print job to the grid computing system 100. Further, the grid distributed resource manager 5 includes an information repository 10 for storing attributes associated with the grid subdivisions 91-93 and the nodes 30, 40, and 50 of each grid subdivision 91-93. Additionally, the grid distributed resource manager 5 has a log unit 15 for logging various events. The grid distributed resource manager 5 is coupled to the grid subdivisions 91-93 via connections 94, 95, and 96, respectively.

Each grid subdivision 91-93 has a plurality of networked components. These networked components include a plurality of nodes 30, 40, and 50, a log unit 25 for logging various events, and an information repository 20 that stores attributes associated with the nodes 30, 40, and 50 and the grid subdivision. Each grid subdivision 91-93 has several types of nodes. The compute nodes 30 provide distributed computational resources. The storage nodes 40 provide distributed storage resources. Further, the printer nodes 50 provide distributed print resources.

In an embodiment, the grid distributed resource manager 5 provides a virtual printer to the user 80 based on the distributed print resources of the printer nodes 50. Further, the grid distributed resource manager 5 accepts print jobs submitted to the virtual printer by the user 80 and assigns the print jobs to appropriate grid subdivision 91-93 and appropriate printer nodes 50. The virtual printer provides an abstraction level that separates the user 80 from printer-specific information that would otherwise hinder the grid computing system 100. Further, the virtual printer extends benefits such as load sharing, higher resource utilization, and flexibility in terms of selecting resources from a pool of available resources, to print resources. Thus, the user 80 may submit a print job having print specifications at the time the user 80 submits a job, wherein the grid computing system 100 performs the tasks of matching the print specifications with printer nodes 50 and scheduling the print jobs.

Figure 2:
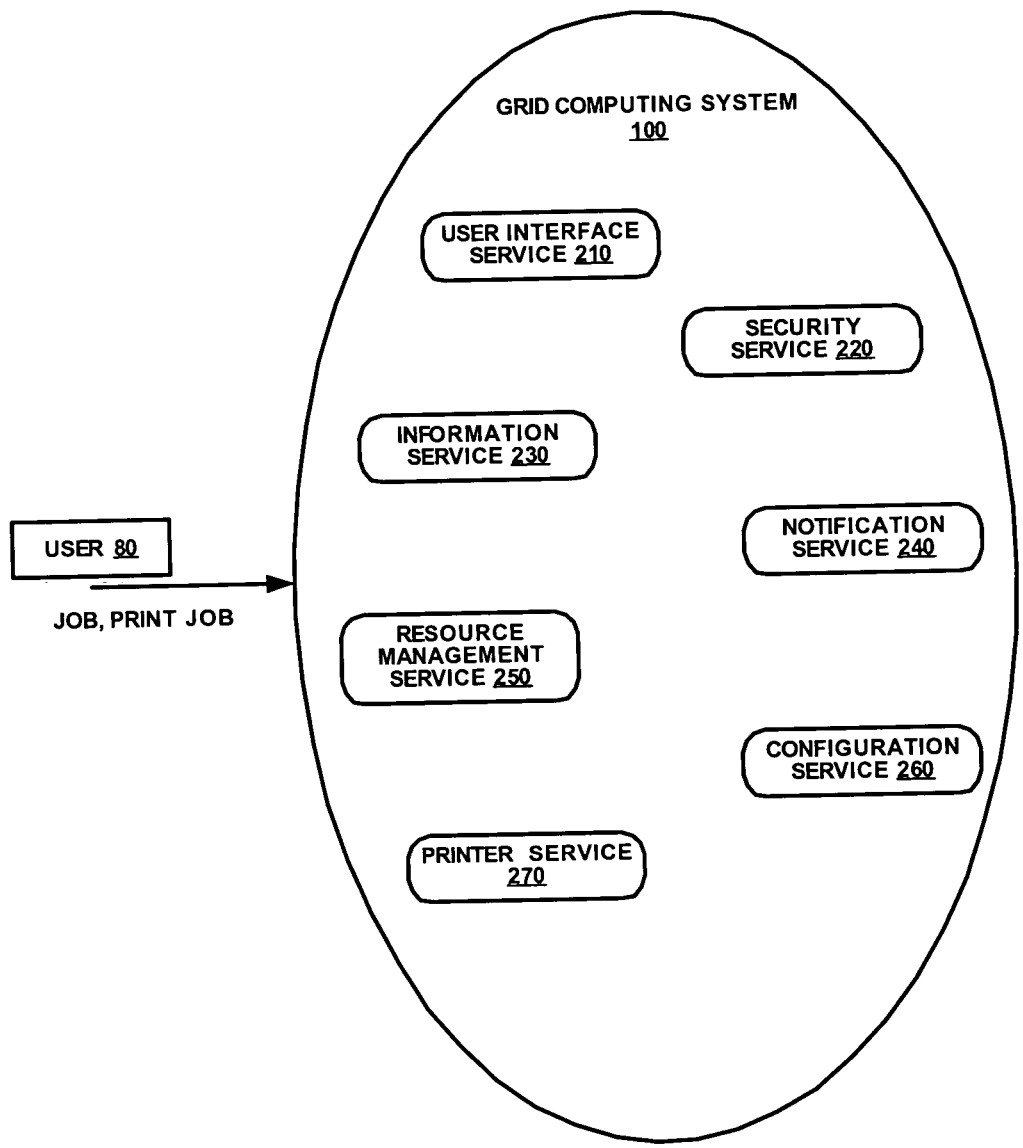
FIG. 2 illustrates a plurality of grid services provided by the grid computing system of FIG. 1 in accordance with an embodiment of the present invention.

FIG. 2 illustrates a plurality of grid services 210-270 provided by the grid computing system 100 of FIG. 1 in accordance with an embodiment of the present invention. Interactions among the networked components of the grid computing system 100 and interactions between the grid computing system 100 and the user 80 are facilitated by grid services 210-270 that are invoked at the appropriate time. A grid service represents an integrated application functionality that may be invoked. The grid service provides seamless and compatible interactions among the networked components and between the grid computing system 100 and the user 80. Some networked components of the grid computing system 100 host grid services 210-270. Other networked components of the grid computing system 100 run applications that contact grid services as clients.

As depicted in FIG. 2, there are several types of grid services. Operation of grid services will be described in detail with respect to FIG. 5. The grid services may include a user interface service 210, a security service 220, an information service 230, a notification service 240, a resource management service 250, and a configuration service 260. Further, the grid services may include a printer service 270. The printer service 270 facilitates the virtual printer based on the distributed print resources of the printer nodes 50. The printer service 270 may accept print jobs submitted to the virtual printer by the user 80 and assigns the print jobs to appropriate grid subdivision 91-93 and appropriate printer nodes 50. That is, the virtual printer is implemented by the grid distributed resource manager 5 and the printer service 270 invoked by the grid distributed resource manager 5.

Figure 3A:
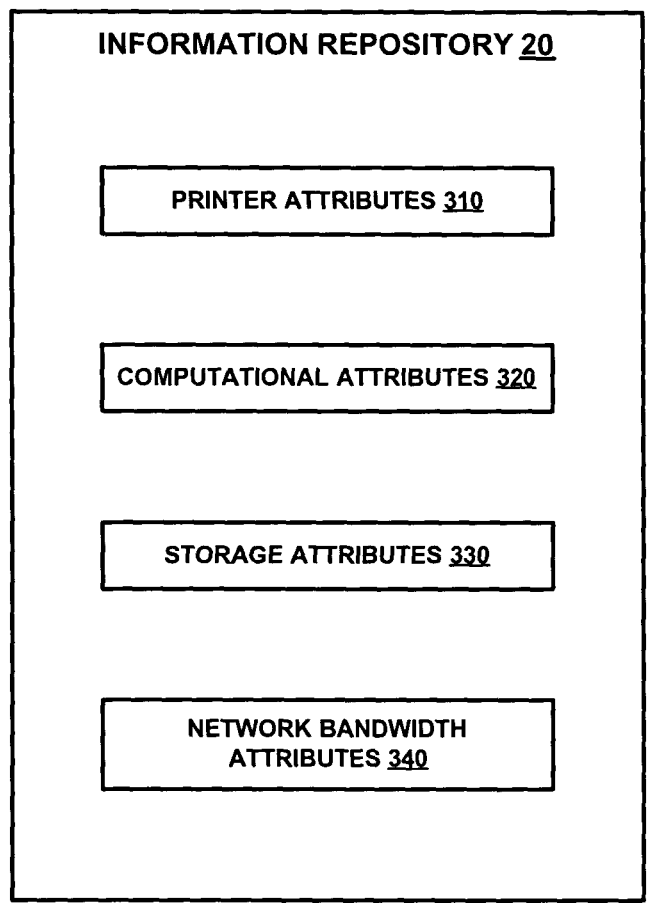
FIG. 3A illustrates an information repository in accordance with an embodiment of the present invention.

FIG. 3A illustrates an information repository 20 of a grid subdivision in accordance with an embodiment of the present invention. The information repository 20 stores a plurality of attributes. Here, the information repository 20 stores printer attributes 310 associated with the printer nodes 50, computational attributes 320 associated with compute nodes 30, storage attributes 330 associated with storage nodes 40, and network bandwidth attributes 340 associated with network resources. The information repository 20 may store other type of information. Further, the information repository 10 of the grid distributed resource manager 5 may have a similar configuration.

By storing the attributes of compute nodes 30, storage nodes 40, and printer nodes 50 in a unified location, a single resource management framework is provided which leads to better and more balanced use of the resources (e.g., computing resources, storage resources, network bandwidth resources, print resources) of the grid computing system 100. Moreover, greater resource flexibility is provided to the user 80. Additionally, resource management is simplified by centralizing the management of the resources of the grid computing system 100.

FIG. 3B illustrates a plurality of printer attributes 350 in accordance with an embodiment of the present invention. Each printer node 50 of the grid computing system 100 may have the printer attributes 350 shown in FIG. 3B. It should be understood that a printer node may have less than or more than the printer attributes illustrated in FIG. 3B.

Figure 3C:
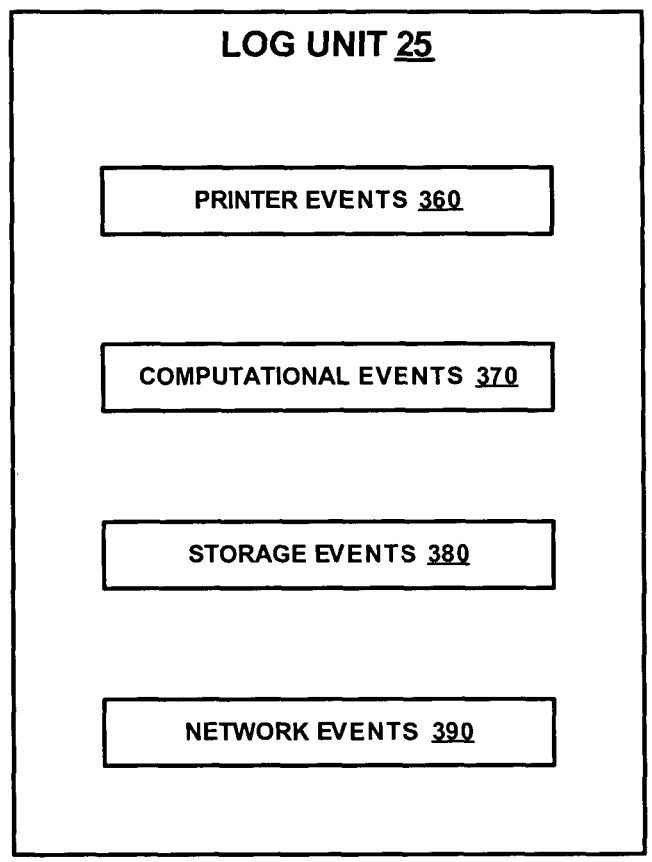
FIG. 3C illustrates a log unit in accordance with an embodiment of the present invention.

FIG. 3C illustrates a log unit 25 of a grid subdivision in accordance with an embodiment of the present invention. The log unit 25 is utilized to log various events. As shown in FIG. 3C, the log unit 25 may log printer events 360, computational events 370, storage events 380, and network events 390. Data mining of this unified log information 360-390 may be used to infer patterns in terms of certain users using specific types of resources such as computational and print resources. This may help with load balancing, capacity planning, etc. Further, the log unit 15 of the grid distributed resource manager 5 may have a similar configuration.

Thus, the virtual printer based on the distributed print resources of the printer nodes 50, the unified storage of attributes in the information repository 20, and the printer service 270 provide several benefits. These benefits include enhancement of user's productivity, increased resource utilization, and simplified resource management.

Figure 4:
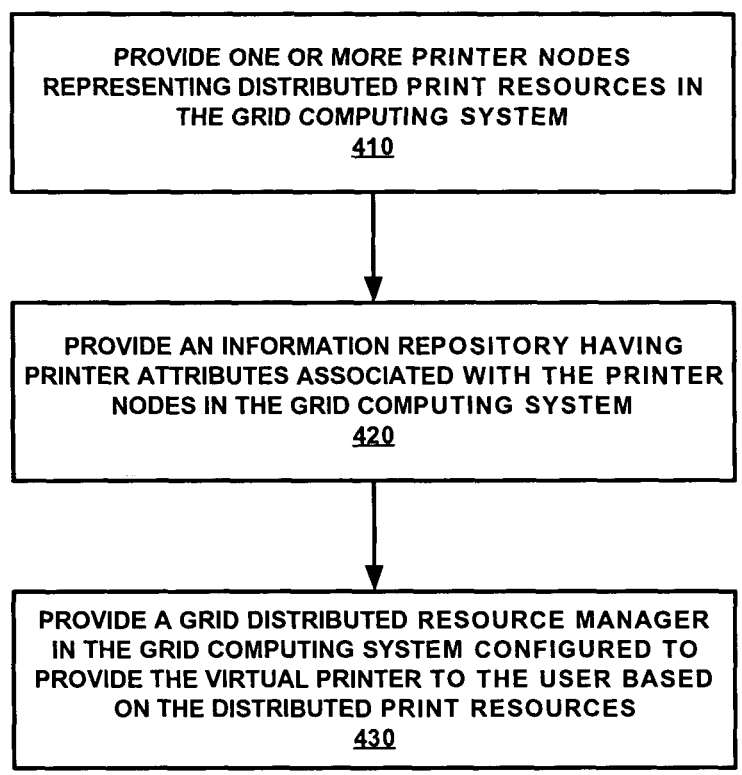
FIG. 4 illustrates a flow chart showing a method of offering a virtual printer to a user in a grid computing system in accordance with an embodiment of the present invention.

FIG. 4 illustrates a flow chart showing a method 400 of offering a virtual printer to a user 80 in a grid computing system 100 in accordance with an embodiment of the present invention. Reference is made to FIGS. 1-3C.

At 410, one or more printer nodes 50 representing distributed print resources are provided in the grid computing system 100. Further, at 420, an information repository 10 and 20 that includes printer attributes associated with the printer nodes 50 is provided in the grid computing system 100. In an embodiment, the grid computing system 100 includes an information service 230, which comprises the information repository 10 and 20.

Continuing, at 430, a grid distributed resource manager 5 is provided in the grid computing system 100, wherein the grid distributed resource manager 5 is configured to provide the virtual printer to the user 80 based on the distributed print resources of the printer nodes 50. In an embodiment, the grid distributed resource manager 5 includes a printer service 270 for facilitating the virtual printer. The grid distributed resource manager 5 may invoke the printer service 270.

The print jobs submitted to the virtual printer by the user 80 are accepted. Moreover, the print jobs are assigned to appropriate printer nodes 50. Each print job may include a plurality of print specifications. The print specifications are compared with the printer attributes (stored in the information repository 10 and 20) in assigning the print job to an appropriate printer node 50. One or more of the print specifications may have a higher priority. For example, the print specification "printer location where user 80 desires to pick up the print output" may have a higher priority than other print specifications because it is inconvenient to send a print job to a print resource located too far from the user 80 or located in a location inaccessible by the user 80. Thus, the higher priority may be utilized to assign the print job to an appropriate printer node 50. Each print job is performed at the appropriate printer node 50 as scheduled by the grid distributed resource manager 5 or the printer service 270.

Figure 5:
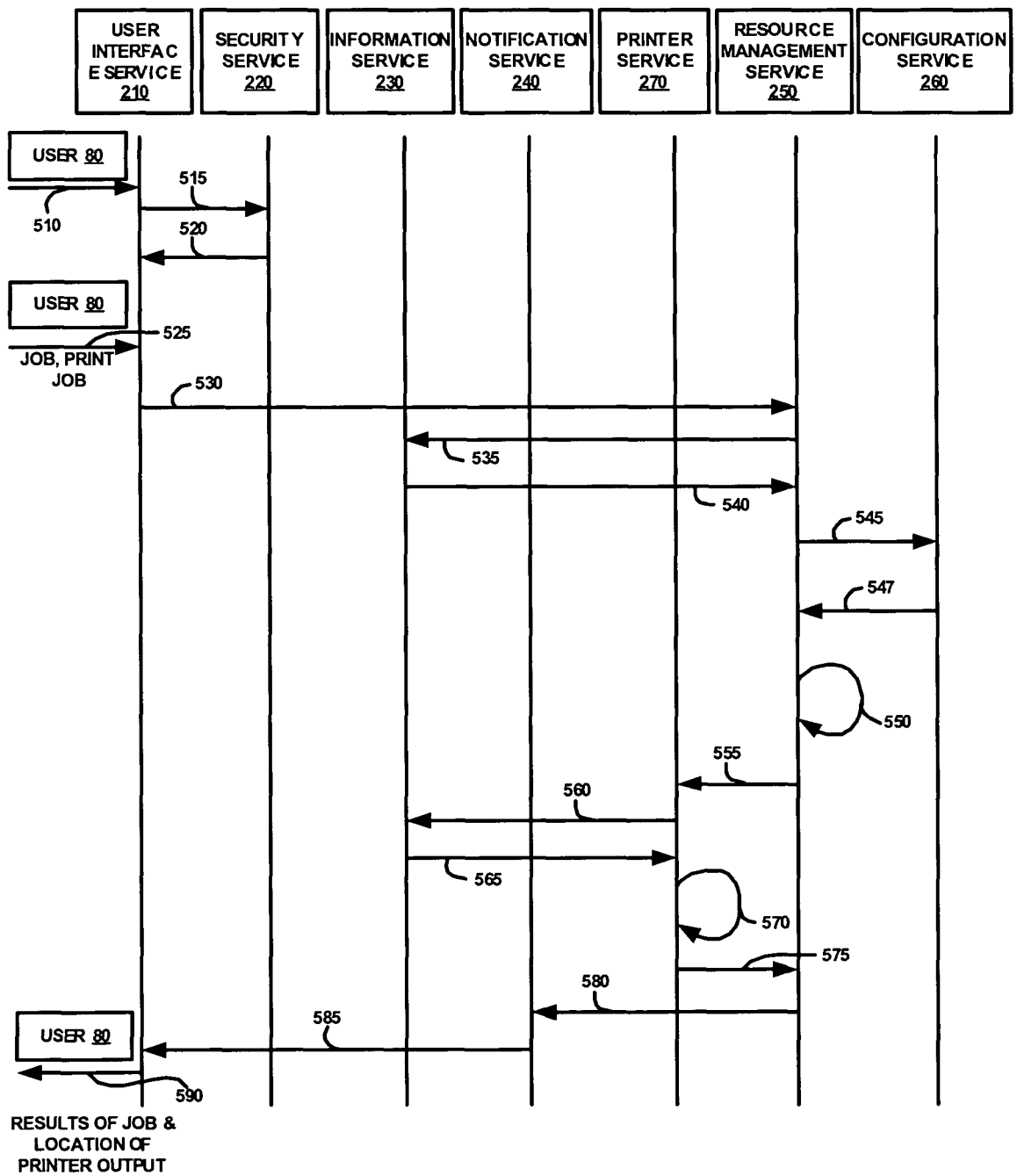
FIG. 5 illustrates operation of a grid computing system having a printer service in accordance with an embodiment of the present invention.

FIG. 5 illustrates operation of the grid computing system 100 of FIGS. 1-2 having a printer service 270 in accordance with an embodiment of the present invention. In practice, the user 80 provides a request to authenticate to the user interface service 210, as indicated by arrow 510. The user interface service 210 invokes the security service 220 to authenticate the user 80, as indicated by arrow 515.

Further, the security service 220 authenticates the user 80, shown by arrow 520. After the user 80 has been successfully authenticated, the user 80 submits a job and a print job, as indicated by the arrow 525. A job may include input data, identification of an application to be utilized, resource requirements for executing the job, and type of notification desired by the user 80. The job may include other information. A print job may include print specifications (e.g., number of copies to print, print color to use, paper size to use, paper orientation to use, printer location where user 80 desires to pick up the print output, etc.) for executing the print job.

Continuing, the user interface service 210 invokes the resource management service 250 to allocate resources, as shown by arrow 530. The resource management service 250 invokes the information service 230 to query the information repository 10 and 20, as indicated by arrow 535. The information service 230 identifies resources for executing the submitted job and provides that information to the resource management service 250, as indicated by arrow 540. Then, the resource management service 250 invokes the configuration service 260 to configure (e.g., by loading appropriate application(s)) one or more of the identified resources to execute the submitted job, as depicted by arrow 545. After configuring the identified resources, the configuration service 260 notifies the resource management service 250, as indicated by arrow 547.

Furthermore, the resource management service 250 schedules and runs the submitted job, as indicated by arrow 550. After the submitted job is completed, the resource management service 250 sends the submitted print job to the printer service 270, as shown by arrow 555. The printer service 270 invokes the information service 230 to query the information repository 10 and 20, as indicated by arrow 560. The information service 230 identifies print resources for executing the submitted print job and provides that information to the printer service 270, as indicated by arrow 565. The printer service 270 schedules and runs the submitted print job, as indicated by arrow 570. After the submitted print job is completed, the printer service 270 notifies the resource management service 250, as shown by arrow 575.

Moreover, the resource management service 250 notifies the notification service 240 that the submitted job and submitted print job have been completed, as indicated by arrow 580. The notification service 240 notifies the user interface service 210 that the submitted job and submitted print job have been completed, as indicated by arrow 585. Then, the user interface service 210 outputs the results of the submitted job and the location of the printer output, as indicated by arrow 590.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A grid computing system comprising:
   one or more printer nodes representing distributed print resources;
   an information repository including printer attributes associated with said printer nodes; and
   a grid distributed resource manager for providing a virtual printer to a user based on said distributed print resources and for accepting and assigning print jobs submitted to said virtual printer by said user.

2. The grid computing system as recited in claim 1 wherein said print job includes a plurality of print specifications.

3. The grid computing system as recited in claim 2 wherein said grid distributed resource manager compares said print specifications with said printer attributes to assign said print job to an appropriate printer node.

4. The grid computing system as recited in claim 3 wherein said appropriate printer node performs said print job as scheduled by said grid distributed resource manager.

5. The grid computing system as recited in claim 3 wherein one or more of said print specifications have a higher priority, and wherein said higher priority is utilized to assign said print job to said appropriate printer node.

6. The grid computing system as recited in claim 1 further comprising:
   one or more compute nodes representing distributed computational resources, and wherein said information repository further includes computational attributes associated with said compute nodes.

7. The grid computing system as recited in claim 1 further comprising:
   one or more storage nodes representing distributed storage resources, and wherein said information repository further includes storage attributes associated with said storage nodes.

8. A grid computing system comprising:
   one or more printer nodes representing distributed print resources;
   an information service for storing printer attributes associated with said printer nodes; and
   a printer service for providing a virtual printer based on said distributed print resources and for accepting and assigning print jobs submitted to said virtual printer.

9. The grid computing system as recited in claim 8 wherein said print job includes a plurality of print specifications.

10. The grid computing system as recited in claim 9 wherein said print service compares said print specifications with said printer attributes to assign said print job to an appropriate printer node.

11. The grid computing system as recited in claim 10 wherein said appropriate printer node performs said print job as scheduled by said print service.

12. The grid computing system as recited in claim 10 wherein one or more of said print specifications have a higher priority, and wherein said higher priority is utilized to assign said print job to said appropriate printer node.

13. The grid computing system as recited in claim 8 further comprising:
   one or more compute nodes representing distributed computational resources, and wherein said information service further stores computational attributes associated with said compute nodes.

14. The grid computing system as recited in claim 8 further comprising:
   one or more storage nodes representing distributed storage resources, and wherein said information service further stores storage attributes associated with said storage nodes.

15. A method of offering a virtual printer to a user in a grid computing system, said method comprising:

providing one or more printer nodes representing distributed print resources in said grid computing system;

providing an information repository including printer attributes associated with said printer nodes in said grid computing system; and providing a grid distributed resource manager in said grid computing system configured to provide said virtual printer to said user based on said distributed print resources.

16. The method as recited in claim 15 further comprising:
accepting and assigning print jobs submitted to said virtual printer by said user.

17. The method as recited in claim 16 wherein said print job includes a plurality of print specifications.

18. The method as recited in claim 17 further comprising:
comparing said print specifications with said printer attributes to assign said print job to an appropriate printer node.

19. The method as recited in claim 18 further comprising:
performing said print job at said appropriate printer node as scheduled by said grid distributed resource manager.

20. The method as recited in claim 18 wherein one or more of said print specifications have a higher priority, and said method further comprising:

utilizing said higher priority to assign said print job to said appropriate printer node.

21. The method as recited in claim 15 wherein said grid computing system further comprises:

one or more compute nodes representing distributed computational resources, and wherein said information repository further includes computational attributes associated with said compute nodes.

22. The method as recited in claim 15 wherein said grid computing system further comprises:

one or more storage nodes representing distributed storage resources, and wherein said information repository further includes storage attributes associated with said storage nodes.

23. The method as recited in claim 15 wherein said grid distributed resource manager includes a printer service for facilitating said virtual printer.

24. The method as recited in claim 15 wherein said grid computing system further comprises an information service including said information repository.

* * * * *